Jan. 21, 1958 H. H. McKINNIES 2,820,865
ELECTRIC SIGNALING GAUGES
Filed Nov. 4, 1955
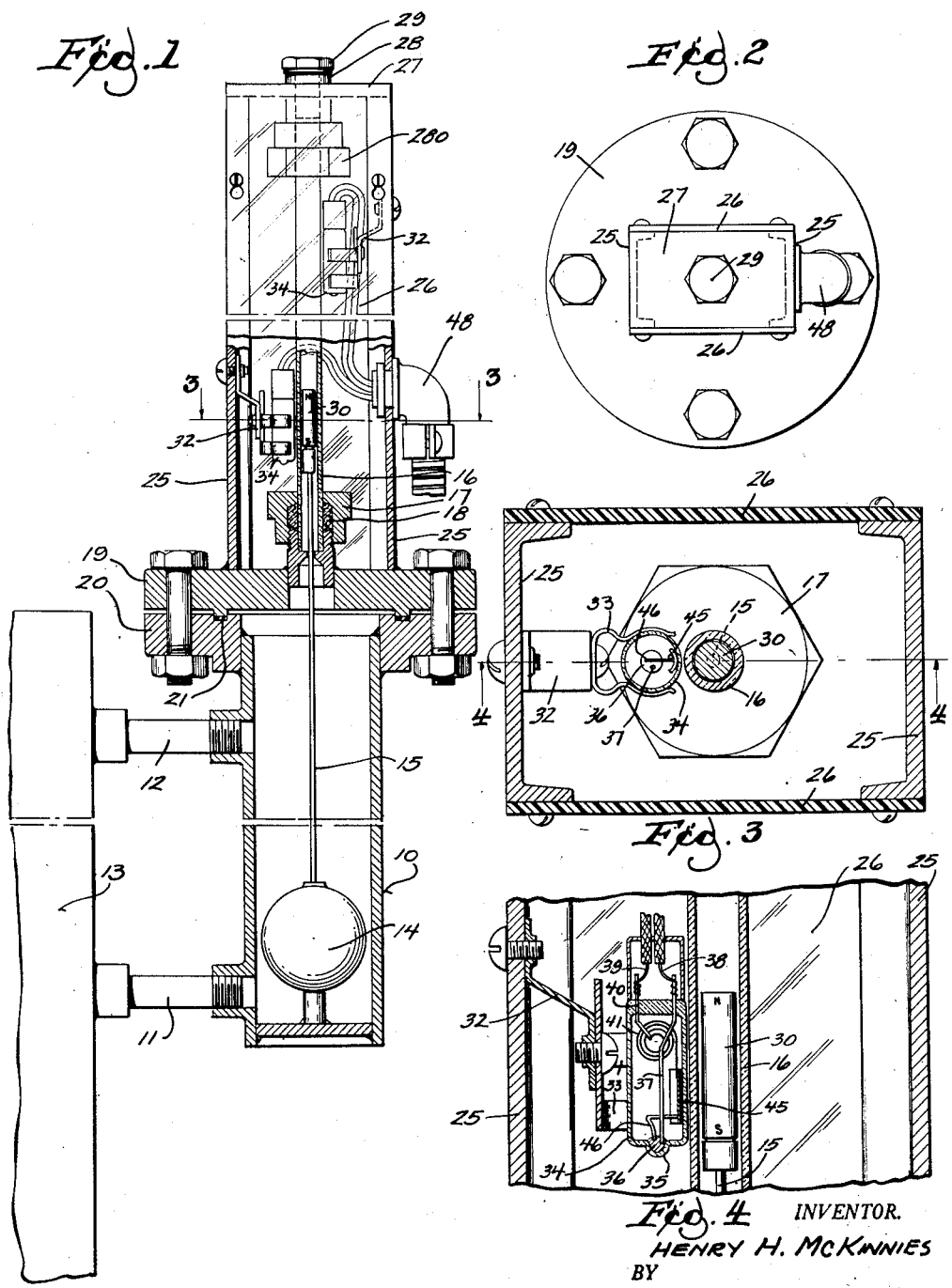
INVENTOR.
HENRY H. McKINNIES
BY
Wheeler, Wheeler + Wheeler
ATTORNEYS

United States Patent Office 2,820,865
Patented Jan. 21, 1958

2,820,865

ELECTRIC SIGNALING GAUGES

Henry H. McKinnies, Milwaukee, Wis.

Application November 4, 1955, Serial No. 545,096

8 Claims. (Cl. 200—84)

This invention relates to an improvement in electric signaling gauges.

This is a continuation in part of my application Serial No. 152,226, now abandoned, and discloses a structure differing specifically from any therein illustrated.

My gauge magnetically actuates switching means at one or more levels either for the purpose of signaling that the given level has been reached or for the purpose of using the resulting signal to operate a control or some sort. The exact nature of the control is immaterial to the present invention. What is important is the fact that the apparatus provides at all times complete visible indication of the actual liquid level to which the gauge responds. The addition of the magnetic signaling function does not in any way modify or affect the visual checking of liquid levels.

In the present device there is also a complete enclosure for the gauge tube in which the magnetic actuating member operates and this enclosure comprises a metallic frame with transparent side walls, the enclosure protecting the mechanism from dirt and changes in temperature without interfering with visibility of the level responsive portion of the gauge.

In the drawings:

Fig. 1 is a view fragmentarily illustrating partial inside elevation and partially vertical axial checking gauge structure embodying my invention.

Fig. 2 is a plan view of the gauge structure shown in Fig. 1.

Fig. 3 is an enlarged detail view taken in section on the line 3—3 of Fig. 1.

Fig. 4 is a detail view taken on section on line 4—4 of Fig. 3.

The float chamber 10 is connected by lower pipe 11 and upper pipe 12 with a refrigerant accumulator, boiler, tank, or other receptacle 13. The float 14 rides at the surface of the liquid in float chamber 10, as communicated to such chamber from tank 13. The float rod 15 extends upwardly through a restricted orifice into a sight glass 16 which communicates with the chamber and, in effect, is a transparent extension thereof. The orifice is so small as to restrict vapor escape in event of sight glass breakage but is of such limited extent as not to inhibit free movement of the rod. A packing gland comprising a nut 17 and packing 18 provides a pressure-tight connection between the sight glass 16 and the closure 19 which is bolted to a flange 20 welded to the upper end of chamber 10. Packing at 21 provides the seal between closure 19 and flange 20.

Welded or otherwise secured rigidly to the closure 19 is a frame 25 comprising two opposite channels as best shown in Fig. 3. Transparent side plates 26 of glass or heavy plastic are screwed to the sides of the frame 25 to complete an enclosure about the sight glass 16. At its upper end the frame 25 has welded to its cross member 27 a sleeve 28 into which the plug 29 is threaded to seal the upper end of the sight glass 16. A packing gland nut 280 similar to that shown at 17 embraces the upper end of the sight glass tube 16 and seals it to the sleeve 28.

Within the sight glass in a position which is clearly visible at all times through the transparent walls 26 and the transparent tube 16 is a magnetic actuator 30 loosely fitting the tube for guidance thereby and adapted for the operation of one or more switches disposed outside of the sight glass 16 but immediately adjacent thereto.

The actuation of the switch or switches is magnetic, the actuator and the responsive member which operates the switch contact being magnetically complementary. Desirably the actuator 30 is a magnet and the responsive switch element is an armature in order to reduce the weight of the responsive part. I do not, however, desire to limit myself to this detail.

The switches disclosed are of a known type in which the switch is hermetically sealed in an oxygen free glass envelope. I provide a mounting bracket or brackets 32 (see Figs. 3 and 4) which include spring clips 33 embracing the glass envelope 34 within which the switch is confined. The envelope has a depression at 35 within which there is a drop of mercury 36 as a fixed contact. The lead wire 37 terminates in the mercury and emerges from the glass envelope to receive connection with conductor 38. Conductor 39 is attached to a wire 40 which carries a light flat spring coil 41 carrying the armature 45 adjacent its free end. The movable contact 46 of the switch is attached to the armature. In the normally open switch illustrated, the contact is biased by spring 41 away from the pool of mercury 36 in a direction which is clockwise as viewed in Fig. 4. In the Fig. 4 position of the parts the attraction of magnet 30 for armature 45 has drawn the armature to the right to engage the moving contact 46 of the switch with the mercury 36 which constitutes the fixed contact, thereby to complete the circuit through the switch. Similar switches may be located at any desired level within the housing provided by frame 25 and transparent closure 26. The electrically conductive leads to and from the several switches may issue from a side of frame 25 through a conventional electrical fitting such as that shown at 48 in Fig. 1. As will be apparent to those skilled in the art, the circuit controlled by the switch may be used directly or through a relay to start or stop a motor, ring a bell, light a light, open or close a valve or to perform any other function which is to be made dependent upon the increase or decrease of liquid level to the point at which the actuator 30 comes opposite the responsive member 45 which brings about switch operation.

It will also be apparent to those skilled in the art that the switch need not be a normally open switch as shown, since any type of switch can be operated by the disclosed organization.

It will be apparent that the functioning of the switches under the control of actuator 30 does not in any manner interfere with the visual determination of liquid level. While the sight glass 16 and the walls 26 have been described as "transparent" it is intended to include within this term a glass sufficiently light-transmitting so that the position of the actuator 30 will be visually apparent to an operator. It will also be clear from the above description that even if the individual switches were not protected by their own sealed envelopes, they would be thoroughly protected against dust, dirt and atmospheric changes for most purposes by the complete enclosure provided by the frames 25 and the transparent side walls 26 which form the shielding housing for the gauge.

I claim:

1. The combination with a flat chamber of a sight tube extension thereof having a transparent wall, a float in the chamber, a magnetic actuator connected with the float and guided for reciprocation in the tube, a switch means including a responsive member for switch operation disposed adjacent the tube and offset laterally from the path of movement of said actuator, said member and actuator being magnetically complementary and said member being magnetically responsive to the proximity of the actuator to operate the switch, said tube and actuator providing a continuously effective visual indication of liquid level in the float chamber upon which said float is buoyed.

2. The device of claim 1 in which said chamber is provided with a flange to which there is bolted a closure ring having tube packing through which said tube extends and by which said tube is sealed to said chamber, together with a frame mounted on said closure and having means for positioning the end of the tube remote from said chamber.

3. The device of claim 2 in which said positioning means also comprises a closure for the end of the said tube.

4. The device of claim 2 in which said frame comprises laterally spaced side members and front and rear walls constituting a housing about the sight glass, the position of said actuator being visible through at least one of said walls.

5. The device of claim 4 in which both of said walls are transparent.

6. A gauge comprising a float chamber, a housing mounted on the float chamber, a float in the float chamber, an actuator reciprocable in the housing and connected with the float, the housing being provided with a guide for the actuator and with a transparent wall through which the position of the actuator is substantially at all times visible, and a switch adjacent the path of movement of the actuator and comprising a switch operating member offset laterally from the path of movement of the actuator, the actuator and member being complementarily magnetic, the said housing extending about the guide and switch for the protection of the switch while affording visibility of the actuator position.

7. In a gauge the combination with a float chamber having liquid communication means and a mounting flange, of an annular closure attached to the flange and provided with an opening communicating with the float chamber, a frame mounted on the annular closure across said opening, a float in the float chamber, a float rod extending upwardly through said opening, an actuator carried by the rod externally of the float chamber, a transparent sight tube connected with said closure in registry with the opening and into which has rod extends, said actuator loosely fitting said tube to receive guidance therefrom, means carried by the frame remote from the float chamber positioning the outer end of the tube and switch means mounted on the frame adjacent the tube and including a magnetically responsive contact operating member, said actuator comprising a magnet and being visible at all times through said tube to indicate liquid levels in the float chamber to which the float and actuator are responsive, the switch including relatively fixed contact means and movable contact means connected with said magnetically responsive member and normally biased to position in which said member is relatively remote from the tube, said member and the movable contact means being operable in opposition to said bias by the magnetism of said actuator when said actuator is proximate to said member.

8. The device of claim 7 in which said closure and said frame are provided with packing means embracing the respective ends of said tube.

References Cited in the file of this patent

UNITED STATES PATENTS

| | | |
|---|---|---|
| 2,236,360 | Beam | Mar. 25, 1941 |
| 2,620,412 | Ford | Dec. 2, 1952 |

U. S. DEPARTMENT OF COMMERCE
PATENT OFFICE

CERTIFICATE OF CORRECTION

Patent No. 2,820,865                           January 21, 1958

Henry H. McKinnies

It is hereby certified that error appears in the printed specification of the above numbered patent requiring correction and that the said Letters Patent should read as corrected below.

Column 2, line 70, for "flat" read -- float --; column 4, line 12, for "has" read -- said --.

Signed and sealed this 25th day of March 1958.

(SEAL)
Attest:
KARL H. AXLINE
Attesting Officer

ROBERT C. WATSON
Commissioner of Patents